(12) United States Patent
Sato

(10) Patent No.: US 6,819,713 B1
(45) Date of Patent: Nov. 16, 2004

(54) IMAGE PROCESSING APPARATUS AND METHOD FOR CORRECTING A DETECTED LUMINANCE AND ENCODING OR DECODING

(75) Inventor: Kazuya Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/422,103

(22) Filed: Oct. 20, 1999

(30) Foreign Application Priority Data

Oct. 23, 1998 (JP) .......................................... 10-301908

(51) Int. Cl.[7] .............................. H04B 7/66; G04N 7/26
(52) U.S. Cl. ................................................. 375/240.12
(58) Field of Search ............................. 375/240, 240.01, 375/240.25, 240.26, 240.28, 240.29; 348/390.01, 416.1, 467; 358/335; 382/232, 239, 274; H04B 2/66; G04N 7/26

(56) References Cited

U.S. PATENT DOCUMENTS

| | | | | |
|---|---|---|---|---|
| 5,526,134 A | * | 6/1996 | Furuki et al. | ................ 358/335 |
| 5,544,263 A | * | 8/1996 | Iwamura | ..................... 382/166 |
| 5,739,871 A | * | 4/1998 | Kim | ........................... 348/674 |
| 5,959,672 A | * | 9/1999 | Sasaki | ..................... 348/390.1 |
| 6,040,865 A | * | 3/2000 | Kato et al. | ................ 348/416.1 |
| 6,222,882 B1 | * | 4/2001 | Lee et al. | ............. 375/240.16 |
| 6,473,465 B1 | * | 10/2002 | Takahashi | ............. 375/240.28 |

* cited by examiner

*Primary Examiner*—Tung Vo
(74) *Attorney, Agent, or Firm*—Fitzpatrick, Cella, Harper & Scinto

(57) ABSTRACT

An image processing apparatus and method in which image data is input and the luminance change between the input image data and the image data of a frame adjacent to the input image data is detected. The input image data is corrected in accordance with the detection result so that the luminance change from the image data of the adjacent frame becomes small, and the corrected input image data is inter-encoded.

23 Claims, 9 Drawing Sheets

FIG. 4

| FIG. 4A |
|---|
| FIG. 4B |

FIG. 4A

| HIERARCHY | ABBREVIATION | NAME | BIT LENGTH | CONTENTS |
|---|---|---|---|---|
| PICTURE LAYER | PSC | PICTURE START CODE | 20 | PICTURE START CODE |
| | TR | TEMPORAL REFERENCE | 5 | TIME SERIES SERIAL NUMBER OF EACH PICTURE. WHEN FRAME IS SKIPPED, THE NUMBER IS NOT SERIAL. |
| | PTYPE | PICTURE TYPE INFORMATION | 6 | TYPE DISCRIMINATION (CIF/QCIF ETC) OF PICTURE |
| | PEI | PICTURE EXTRA INSERTION INFORMATION | 1 | DESIGNATION FLAG AS TO WHETHER USER DATA FOLLOWS AS PICTURE LAYER |
| | PSPARE | PICTURE LAYER SPARE INFORMATION | 8 | PICTURE LAYER AUXILIALY INFORMATION PEI=1 FOR USER DATA PEI=0 FOR SKIP |
| GOB LAYER | GBSC | GOB START CODE | 16 | GOB START CODE |
| | GN | GROUP NUMBER | 4 | SEQUENCE NUMBER (1 TO 12) OF GOB |
| | GQUANT | GOB LAYER QUANTIZER INFORMATION | 5 | QUANTIZATION CHARACTERISTIC (1 TO 31) IN GOB LAYER |
| | GEI | GOB EXTRA INSERTION INFORMATION | 1 | DESIGNATION FLAG AS TO WHETHER USER DATA FOLLOWS AS GOB LAYER |
| | GSPARE | GOB LAYER SPARE INFORMATION | 8 | GOB AUXILIALY INFORMATION GEI=1 FOR USER DATA GEI=0 FOR SKIP |

FROM FIG. 4A

| | | | |
|---|---|---|---|
| MACRO BLOCK (MB) LAYER | MBA STUFF | MACROBLOCK ADDRESS STUFFING | 11 | DUMMY CODE USED FOR LESS AMOUNT OF GENERATED CODES |
| | MBA | TMACROBLOCK ADDRESS | 1-11 | DIFFERENCE BETWEEN ABSOLUTE ADDRESS OF MB AND ABSOLUTE ADDRESS OF MB TRANSFERRED BEFORE BY ONE MB |
| | MTYPE | MACROBLOCK TYPE INFORMATION | 1-10 | ENCODING-MODE OF MB |
| | MQUANT | MACROBLOCK LAYER QUANTIZER INFORMATION | 5 | QUANTIZATION CHARACTERISTIC (1 TO 31) ON AND AFTER MB |
| | MVD | MOTION VECTOR DATA | 1-11 | MOTION VECTOR DIFFERENCE VALUE INCLUDING HORIZONTAL AND VERTICAL COMPONENTS |
| | CBP | CODED BLOCK PATTERN | 3-9 | PATTERN OF BLOCK CHANGING COMPARED WITH PREVIOUS PICTURE AMONG SIX BLOCKS INCLUDED IN MB |
| BLOCK LAYER | TCOEFF | TRANSFORM COEFFICIENTS | 2-17 OR 20 | RUN, TWO-DIMENSIONAL VLC OF LEVEL OR ESCAPE CODE (6 BITS), RUN (6 BITS), LEVEL (8 BITS) OF QUANTIZED TRANSFORM COEFFICIENT |
| | EOB | END OF BLOCK | 2 | BLOCK END CODE INDICATING THAT COEFFICIENTS OF FOLLOWING BLOCKS ARE ZERO |

IMAGE PROCESSING APPARATUS AND METHOD FOR CORRECTING A DETECTED LUMINANCE AND ENCODING OR DECODING

BACKGROUND OF THE INVENTION

1. Field of the Invention

The present invention relates to an image processing method and apparatus for efficiently encoding/decoding image data.

2. Related Background Art

As a moving image encoding scheme for realizing TV phones or TV conference at a low bit rate, H.261 or H.263 stipulated by the ITU is used. In these schemes, an image is divided into macro blocks each having 16×16 pixels, and DCT, motion compensation, and variable length encoding are performed in each macro block to encode the image. An encoding apparatus determines transmission or non-transmission for each macro block. For transmission, the apparatus must determine INTRA encoding (all data are encoded) or INTER encoding (only difference information is encoded). The determination scheme is not specified. In many cases, the scheme is determined on the basis of, e.g., difference information.

A conventional encoding apparatus directly encodes an image input from an image input apparatus such as a camera. The image itself is not changed to improve the encoding efficiency.

H.261 or H.263 assumes indoor images with less motion, e.g., a TV conference. Since an image is encoded using a difference image between a previous frame and a current frame, the code amount is small when the change is small.

However, the luminance of an entire indoor image finely changes due to flicker of a fluorescent lamp or the like. Hence, even when an image without any change is being sensed, the difference value becomes large because of the luminance change in the entire image, resulting in degradation in encoding efficiency. When the average luminance of the entire image largely changes due to, e.g., movement of an object, the ambient luminance is also changed by the luminance correction function of the image input apparatus. If such an input image is directly encoded, the difference value between the current and previous images becomes large even at a portion with no change such as background. This increases the code length and therefore communication cost.

As described above, in an image encoding apparatus which realizes information compression using interframe difference (INTER encoding), the code amount largely changes in accordance with the degree of change.

SUMMARY OF THE INVENTION

The present invention has been made in consideration of the above situation, and has as its object to provide an image processing apparatus and method capable of efficiently encoding input image data even when the luminance of the image data finely changes in units of frames.

According to one aspect of the present invention, there is provided an image processing apparatus/method in which image data is input, the luminance change between the input image data and the image data of a frame adjacent to the input image data is detected, the input image data is corrected in accordance with the detection result so that the luminance change from the image data of the adjacent frame becomes small, and the corrected input image data is INTER-encoded.

It is another object of the present invention to provide an image processing apparatus and method capable of faithfully restoring the original image from efficiently encoded image data.

According to another aspect of the present invention, there is provided an image processing apparatus/method in which image data which is luminance-corrected and encoded so that the luminance change between the image data and image data of an adjacent frame becomes small, the encoded image data is decoded, and luminance correction inverse to luminance correction in encoding is performed for the decoded image data.

Other objects, features and advantages of the invention will become apparent from the following detailed description taken in conjunction with the accompanying drawings.

BRIEF DESCRIPTION OF THE DRAWINGS

FIG. 4, which is comprised of FIG. 4A and 4B, is a view for explaining abbreviations used in FIG. 3;

DESCRIPTION OF THE PREFERRED EMBODIMENT

The embodiment of the present invention will be described below in detail with reference to the accompanying drawings.

Figure 1:
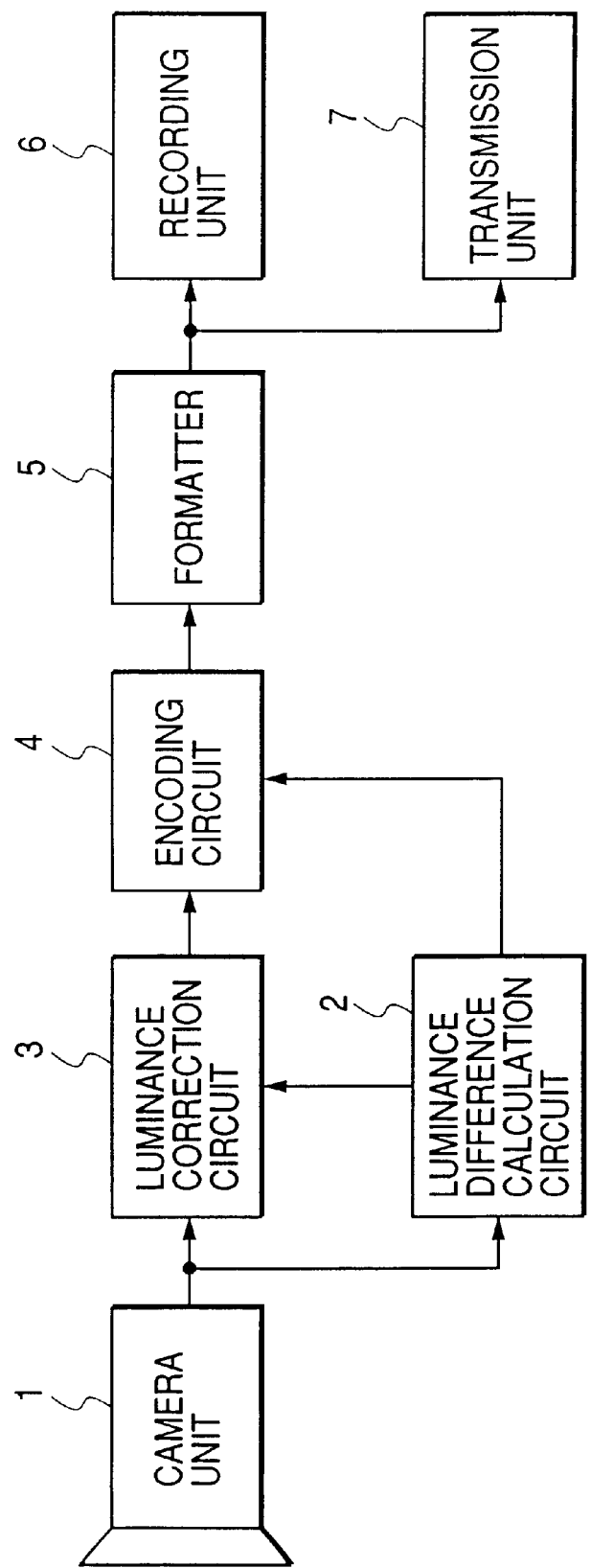
FIG. 1 is a block diagram showing the arrangement of an image processing apparatus according to the embodiment of the present invention.

FIG. 1 is a block diagram showing the arrangement of an image processing apparatus according to the embodiment of the present invention.

Referring to FIG. 1, image data sensed by a camera unit 1 is input to a luminance difference calculation circuit 2 and correction circuit 3.

The luminance difference calculation circuit 2 has a frame memory (not shown). The luminance difference calculation circuit 2 calculates the difference between the current frame image and the previous frame image stored in the frame memory, and calculates a luminance difference average value for each macro block which is an encoding unit of an encoding circuit 4. The calculation result is output to the correction circuit 3 and encoding circuit 4.

The correction circuit 3 determines whether the difference average value can be expressed by 8 bits from −128 to 127. When the difference average value cannot be expressed by 8 bits, the correction circuit 3 determines that the macro block has a large change and does not correct the luminance of the input image data.

When the difference average value can be expressed by 8 bits, the entire macro block is corrected using the difference average value as a luminance correction parameter. With this processing, image data having less luminance change between frames can be obtained.

The image data processed by the correction circuit 3 is encoded by the encoding circuit 4.

The encoding circuit 4 will be described in detail with reference to FIG. 2.

This embodiment complies with the encoding algorithm of ITU-T (International Telecommunication Union-Telecommunication Standardization Sector) H.261. In H.261, there is no mention of switching control for macro block transmission/non-transmission and INTRA/INTER encoding mode (to be described below).

Figure 2:
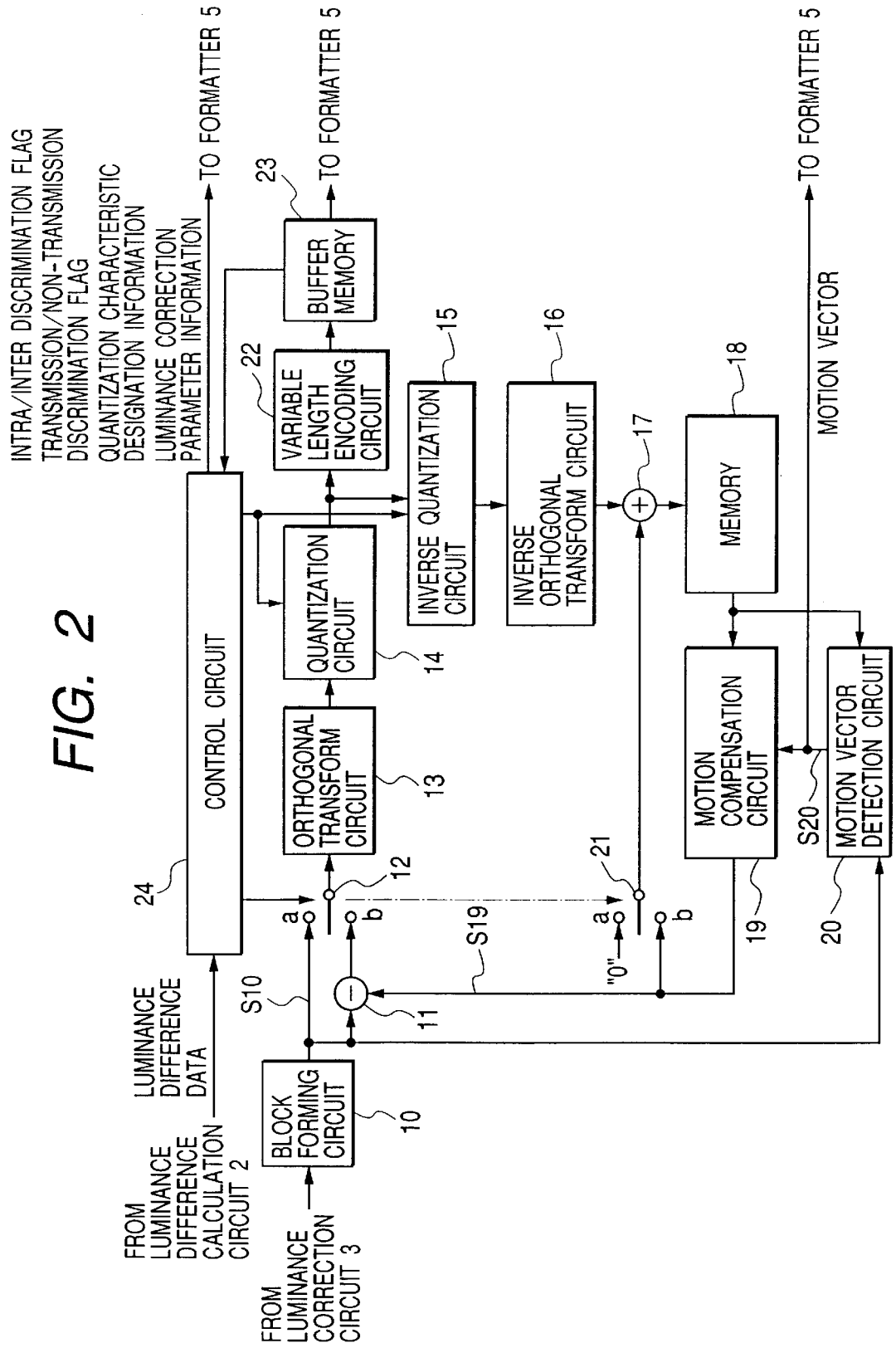
FIG. 2 is a block diagram showing the arrangement of an encoding circuit 4.

FIG. 2 is a block diagram showing the detailed arrangement of the encoding circuit 4.

Referring to FIG. 2, the image data input from the correction circuit 3 is broken up, by a block forming circuit 10, into blocks each having m horizontal pixels and n horizontal pixels (e.g., m=n=8, i.e., 8×8 pixel units). In addition, the luminance signal and chrominance signals are converted into encoding unit block (to be referred to as a macro block hereinafter) data S10 having 16×16 pixels.

The macro block data S10 is supplied to a predictive error calculation circuit 11, a terminal a of a change-over switch 12, and a motion vector detection circuit 20.

The predictive error calculation circuit 11 calculates difference data S11 between the macro block data S10 and prediction data S19 generated by a motion compensation circuit 19 and supplies the difference data S11 to a terminal b of the change-over switch 12. The change-over switches 12 and 21 are controlled by a control circuit 24 by a method to be described later.

The data selected by the change-over switch 12 is input to an orthogonal transform circuit 13. The orthogonal transform circuit 13 computes the orthogonal transform coefficient of the input data by the DCT (Discrete Cosine Transform) and inputs the computed orthogonal transform coefficient to a quantization circuit 14. The quantization circuit 14 quantizes the orthogonal transform coefficient. The quantization step is controlled by the control circuit 24 in accordance with the data occupation ratio of a buffer memory 23 (to be described later).

The data quantized by the quantization circuit 14 is supplied to an inverse quantization circuit 15 and variable length encoding circuit 22.

The variable length encoding circuit 22 variable-length-encodes the quantized data output from the quantization circuit 14 according to frequency of generatin of data. The variable-length-encoded data is supplied to the buffer memory 23.

The buffer memory 23 temporarily stores the variable-length-encoded data and outputs it to the subsequent circuit at a predetermined transfer rate. The buffer memory 23 sequentially detects the residual data amount in the memory (data occupation ratio in the buffer memory) and supplies the detection result to the control circuit 24.

The control circuit 24 controls the quantization step of the quantization circuit 14 and inverse quantization circuit 15 in accordance with the residual data amount.

Under this control, the data is supplied to a formatter 5 while maintaining an appropriate residual data amount in the buffer memory 23.

The data input to the inverse quantization circuit 15 is inversely quantized by characteristics inverse to those of the quantization circuit 14 and supplied to an inverse orthogonal transform circuit 16.

The data input to the inverse orthogonal transform circuit 16 is inversely orthogonally transformed by characteristics inverse to those of the orthogonal transform circuit 13.

The data inversely orthogonally transformed by the inverse orthogonal transform circuit 16 is input to an addition circuit 17 and added to the data selected by the change-over switch 21.

In the INTRA mode, the macro block data S10 of the current frame input from the change-over switch 12 via the terminal a is subjected to orthogonal transform/quantization and inverse quantization/inverse orthogonal transform and then input to the addition circuit 17. The change-over switch 21 selects a terminal a with no signal. For this reason, the output data from the addition circuit 17 becomes a reconstruction of the macro block data S10 output from the block forming circuit 10.

In the INTER mode, both the change-over switches 12 and 21 are connected to the terminals b. The macro block data S10 from the change-over switch 12 is subjected to quantization/orthogonal transform and inverse quantization/inverse orthogonal transform and then input to the addition circuit 17. From the terminal b of the change-over switch 21, the output data from the motion compensation circuit 19, which is read out from a memory 18, i.e., the prediction data S19 is input to the addition circuit 17. Hence, the output data from the addition circuit 17 becomes a reconstruction of the macro block data S10 output from the block forming circuit 10, as in the INTRA mode.

In both modes, the memory 18 stores data corresponding to the macro block data S10 of the current frame. The stored data is read out with a delay of one frame and supplied to the motion compensation circuit 19 and motion vector detection circuit 20.

The motion vector detection circuit 20 compares the macro block data S10, i.e., the current frame image data with the previous frame image data stored in the memory 18 and supplies a motion vector S20 representing the motion of the encoding block to the prediction data S19. The motion vector S20 is also supplied to the formatter 5.

The motion compensation circuit 19 reads out the previous frame image data from the memory 18 on the basis of the motion vector S20 and supplies the readout data to the predictive error calculation circuit 11 and the terminal b of the change-over switch 21 as the prediction data S19.

The encoding modes include a non-transmission mode in addition to the INTRA/INTER modes. In this mode, the encoded macro block data is not transmitted. When the current macro block image data has no difference from the previous frame image data, the current macro block need not be encoded, and the data amount can be largely reduced.

Switching control between encoding modes will be described next.

The INTRA mode and INTER mode are switched by the control circuit 24.

The control circuit 24 receives the luminance difference average value (luminance correction parameter) from the luminance correction filter 2 and selects the encoding mode on the basis of the value.

As in determination whether image data is to be corrected by the correction circuit 3, when the luminance difference average value cannot be expressed by 8 bits, it is determined that the macro block has a large change, and INTRA encoding mode is set as the encoding mode.

When the luminance difference average value can be expressed by 8 bits, the image data is set in the non-transmission mode or the INTER encoding mode.

When the luminance difference average value is smaller than a predetermined threshold value, it is determined that the macro block is almost the same as the previous frame block, and the non-transmission mode is set not to transmit the encoded data of the macro block. Otherwise, the INTER encoding mode is set.

The control circuit 24 outputs to the formatter 5 the luminance correction parameter information, INTRA/INTER discrimination flag, transmission/non-transmission discrimination flag, and quantization characteristic designation information.

The data encoded by the encoding circuit 4 is formatted into a data structure complying with H.261 by the formatter 5.

Figure 3:
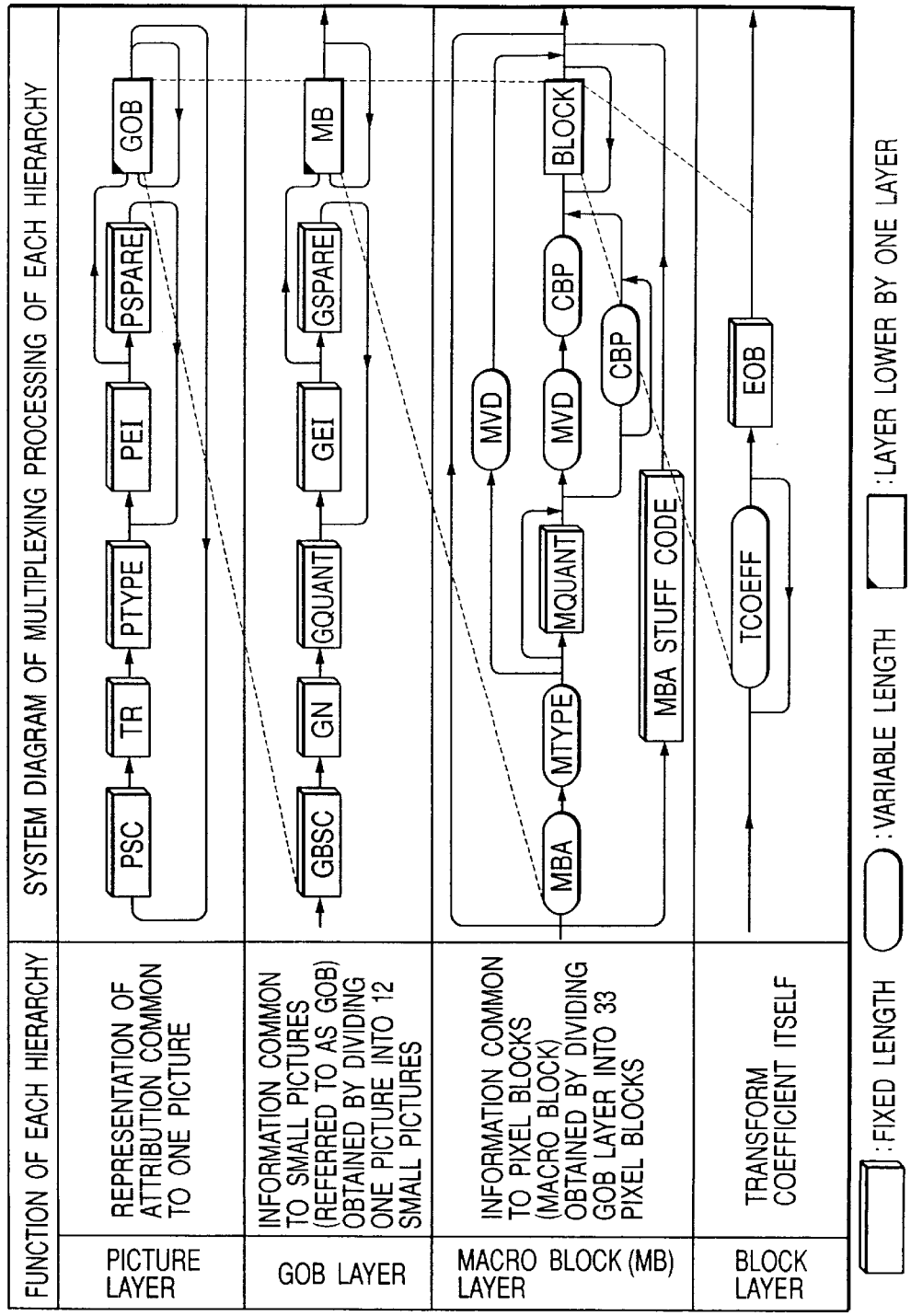
FIG. 3 is a view showing the data structure of H.261.

FIG. 3 shows the data structure of H.261.

As shown in FIG. 3, a hierarchical structure is formed by four layers: a picture layer, GOB (Group of Blocks) layer, macro block layer, and block layer. FIGS. 4A and 4B show explanation of abbreviations in FIG. 3.

This structure is defined by H.261 and therefore cannot be freely altered. The picture layer or GOB layer has, at its header field, an area called a PSPARE (Picture Layer Spare Information) or GSPARE (GOB Layer Spare Information) where user data can be arranged in units of 8 bits.

Figure 5:
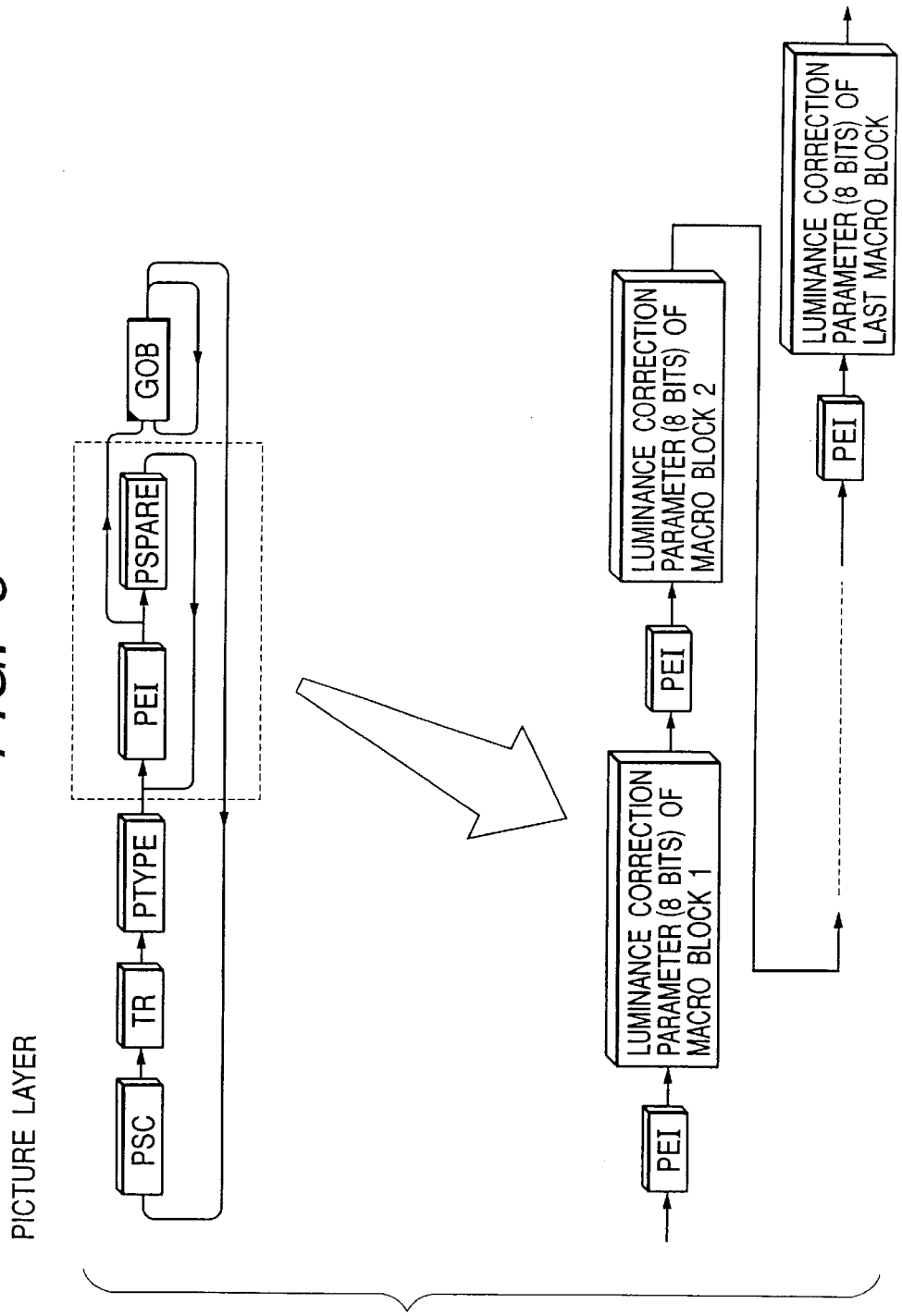
FIG. 5 is a view showing a data structure in which a luminance correction parameter is inserted.

In this embodiment, the luminance correction parameter information used for image data correction or encoding mode control is inserted into the PSPARE in the header field of the picture layer (FIG. 5). Since the added data of each frame has one byte per one macro block, the data amount is 396 bytes for the CIF (Common Intermediate Format) size (352×288 pixels) which is the image format defined by H.261.

Referring back to FIG. 1, the encoded data formatted into the above-described data structure by the formatter 5 is output to a recording unit 6 and transmission unit 7. The recording unit 6 records the encoded data on a recording medium such as a magnetic tape, optical disk, hard disk, or memory. The transmission unit 7 transmits the encoded data to an external device via a digital interface such as USB or IEEE 1394.

The overall operation will be described again with reference to the flow chart shown in FIG. 6.

Figure 6:
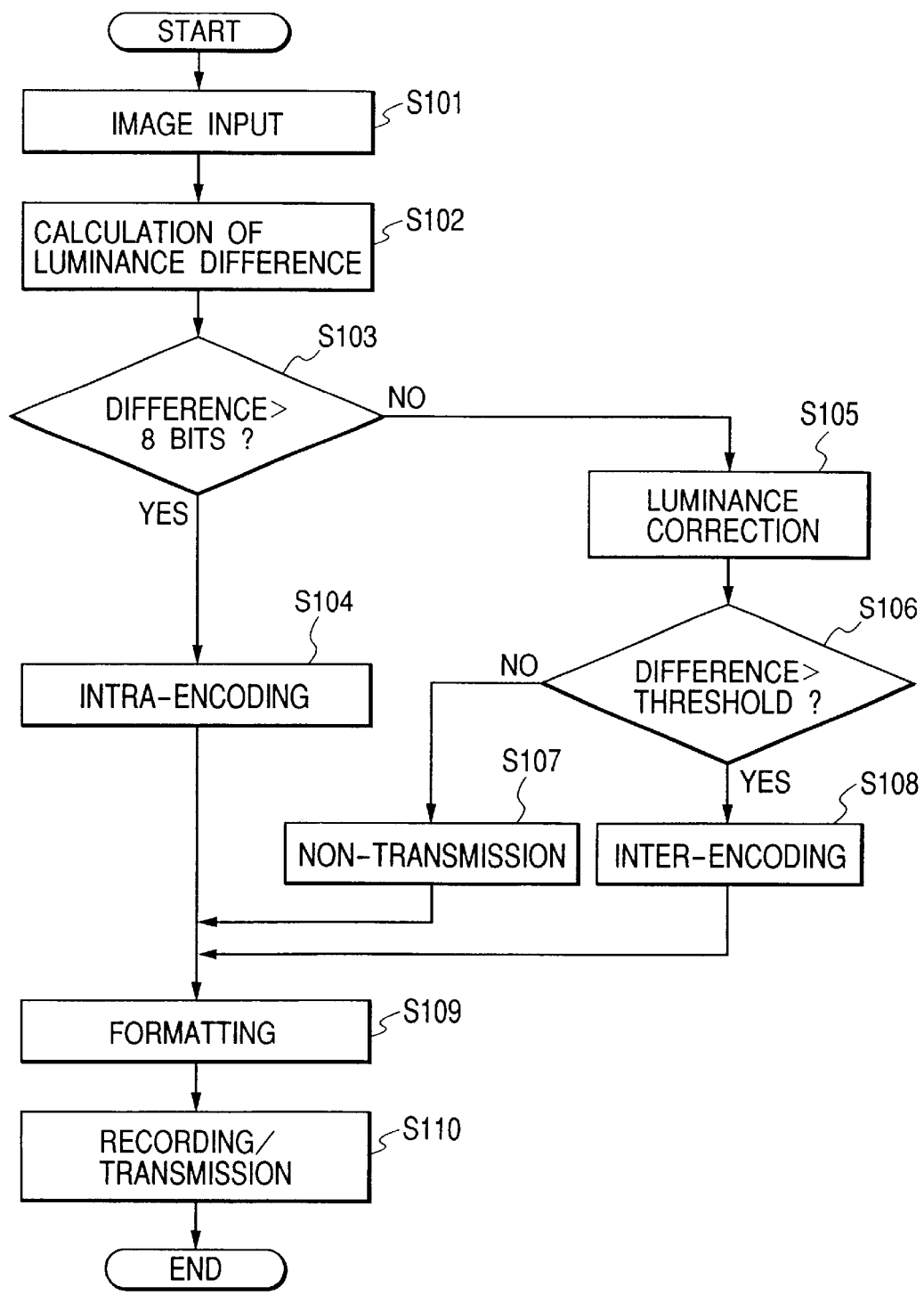
FIG. 6 is a flow chart for explaining processing operation of the image processing apparatus shown in FIG. 1.

FIG. 6 is a flow chart for explaining processing operation of the image processing apparatus shown in FIG. 1.

In step S101, the camera unit 1 inputs image data. In step S102, the difference value from the previous frame image data is calculated in units of macro blocks of the image data, and the luminance difference average value is calculated in units of macro blocks.

In step S103, it is determined whether the difference average value from −128 to 127 can be expressed by 8 bits. If the difference average value cannot be expressed by 8 bits, the flow advances to step S104 to INTRA-encode the macro block by the encoding circuit without luminance correction.

When the difference average value can be expressed by 8 bits, the flow advances to step S105 to correct the luminance of the entire macro block using the difference average value as the luminance correction parameter. More specifically, the difference average value is subtracted from or added to pixel values constructing the macro block to make the luminance level closer to that of the previous frame image data.

In step S106, it is determined whether the difference average value is larger than a predetermined threshold value. If NO in step S106, it is determined that the macro block has less difference from the previous frame image data, and the non-transmission mode is set. If YES in step S106, the macro block is INTER-encoded.

In step S109, the data structure shown in FIG. 3 is formed. At this time, the luminance correction parameter is inserted into PSPARE (Picture Layer Spare Information) which is one type of header of the picture layer.

The flow advances to step S110 to record the formatted data on a recording medium or transmit the data to an external device via a digital interface such as USB or IEEE 1394.

An image processing apparatus for decoding the image data encoded by the above-described image processing apparatus will be described next.

Figure 7:
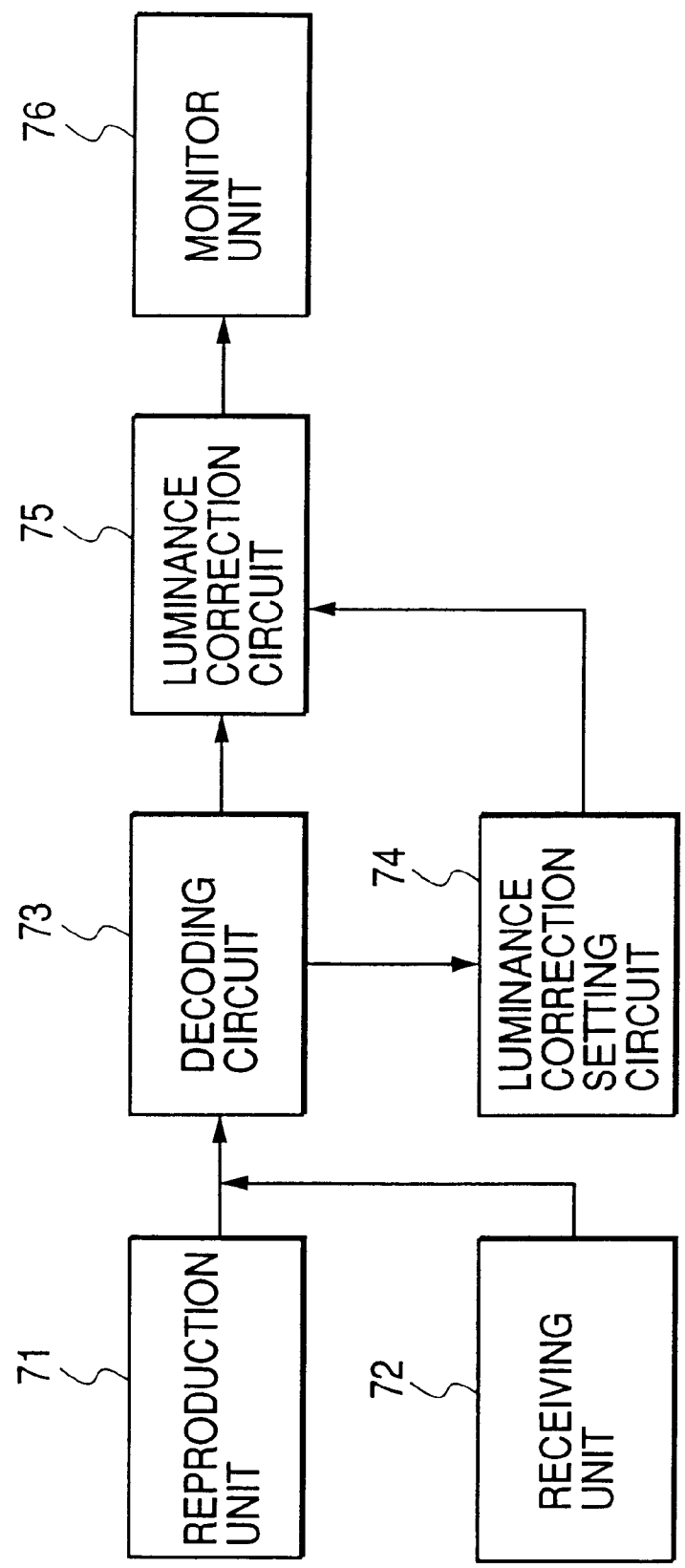
FIG. 7 is a block diagram showing the arrangement of another image processing apparatus according to the embodiment of the present invention.

FIG. 7 is a block diagram showing the arrangement of the image processing apparatus for decoding the image data encoded by the image processing apparatus shown in FIG. 1.

The encoded data having the data structure shown in FIG. 3 is input from a reproduction unit 71 and receiving unit 72. The encoded data is decoded by a decoding circuit 73.

Figure 8:
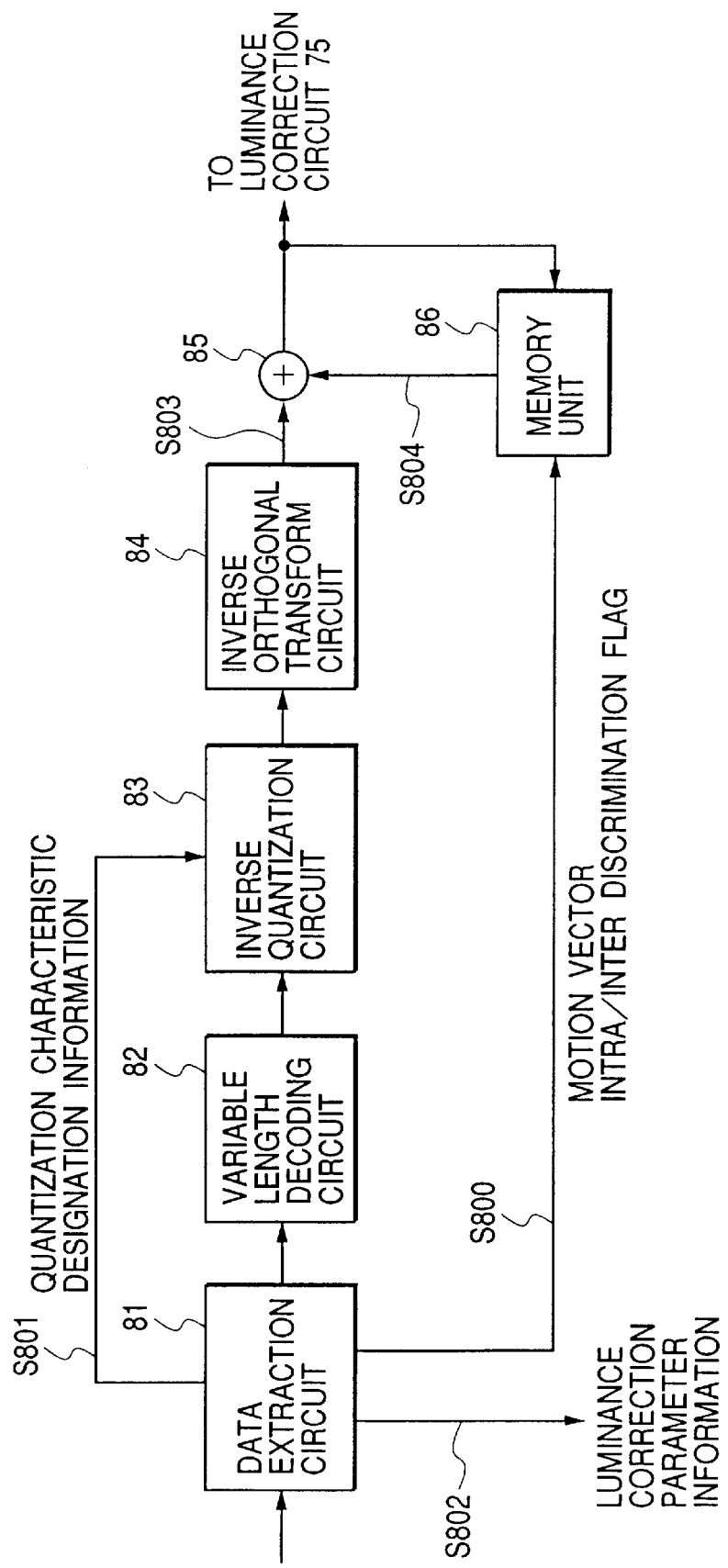
FIG. 8 is a block diagram showing the arrangement of a decoding circuit 73.

FIG. 8 is a block diagram showing the arrangement of the decoding circuit 73 shown in FIG. 7.

A data extraction circuit 81 extracts the data of each header of the data structure shown in FIG. 3. A motion vector S800 is output to a memory unit 86. Quantization characteristic designation information S801 is output to an inverse quantization circuit 83. Luminance correction parameter S802 is output to a luminance correction setting circuit 74 (to be described later).

The variable-length-encoded macro block image data is variable-length-decoded by a variable length decoding circuit 82 and input to the inverse quantization circuit 83. The inverse quantization circuit 83 sets the quantization step on the basis of the quantization characteristic designation information S801 and inversely quantizes the data decoded by the variable length decoding circuit 82. The inversely quantized data is inversely orthogonal transformed by an inverse orthogonal transform circuit 84 and decoded to difference data S803 having the same contents as those of the difference data S11 output from the predictive error calculation circuit 11 shown in FIG. 2.

The memory 86 generates prediction data S804 equal to the prediction data S19 output from the motion compensation circuit 19 shown in FIG. 2 on the basis of the motion vector S800 and outputs the prediction data S804 to an addition circuit 85.

The addition circuit 85 adds the prediction data S804 and difference data S803 to generate macro block data and outputs the generated macro block data to a luminance correction circuit 75 (to be described later).

Operation in the INTER mode has been described above. In the INTRA mode, the difference data S803 is "0".

In the non-transmission mode, the difference data S803 is "0", and the prediction data S804 is output to the luminance correction circuit 75.

The INTRA/INTER discrimination flag for discriminating the encoding mode is also supplied from the data extraction circuit 81 to the memory unit 86 together with the motion vector, so the mode is controlled by the memory unit 86.

The macro block image data decoded in the above-described way is input to the luminance correction circuit 75. The luminance of the image data is corrected on the basis of luminance correction information from the luminance correction setting circuit 74. That is, the image data is subjected to correction inverse to that in encoding on the basis of the luminance correction information to restore the original image input from the camera unit 1.

The luminance correction setting circuit 74 outputs the luminance correction information for setting the luminance correction condition to the luminance correction circuit 75 on the basis of the luminance correction parameter S802 input from the decoding circuit 73.

The image data processed by the luminance correction circuit 75 is output to a monitor unit 76 and displayed on a monitor.

In this embodiment, the image processing apparatuses shown in FIGS. 1 and 7 are separated. However, the two image processing apparatuses may be integrated.

As described above, according to this embodiment, the input image is luminance-corrected using correction data according to the luminance change and then encoded. For this reason, the encoding efficiency can be improved without largely changing the code amount depending on the degree of luminance change. In addition, since the correction data is added to the output code sequence and then output, the input image can be completely restored on the decoding side.

In the above embodiment, the encoding scheme of H.261 is employed. This embodiment can also be applied to, e.g., H.263 or MPEG.

Since MPEG uses the same technique as in H.261, image data can be efficiently encoded by the same procedures as in the embodiment.

When the luminance correction parameter is used to determine not only a method of encoding in units of macro blocks but also a method of encoding in units of frames (I, P, or B picture mode), efficient encoding can be performed. More specifically, when the change is large, and the number of macro blocks to be INTRA-encoded is large, the I picture mode is set. Otherwise, the P or B picture mode using difference data is set.

To determine the P or B picture mode, luminance correction parameters are stored time-serially. When consecutive luminance correction parameters change at a fixed rate, i.e., when the luminance correction parameters can be linearly predicted, the image encoding efficiency can be improved by bi-directional prediction. Hence, the data is encoded in the B picture mode. If the changes do not have a fixed rate, the data is encoded in the P picture mode. Since the picture layer of the MPEG data structure has a header where user data can be inserted, as in H.261, the luminance correction parameter can be inserted into that field and then can be transmitted.

The present invention may be applied to a system constituted by a plurality of devices (e.g., a host computer, an interface device, a video camera, and the like) or an apparatus comprising a single device (e.g., a camera-integrated type VTR, or the like).

The object of the present invention is achieved even by supplying a storage medium storing software program codes for realizing the functions of the above-described embodiment to a system or an apparatus, and causing the computer (or a CPU or an MPU) of the system or the apparatus to read out and execute the program codes stored in the storage medium.

In this case, the program codes read out from the storage medium realize the functions of the above-described embodiment by themselves, and the storage medium storing the program codes also constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiment are realized not only when the readout program codes are executed by the computer but also when the OS (Operating System) running on the computer performs part or all of actual processing on the basis of the instructions of the program codes.

The functions of the above-described embodiment are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:

input means for inputting image data;

detection means for detecting a luminance change between the input image data and image data of a frame adjacent to the input image data;

correction means for correcting the input image data in accordance with an output from said detection means so that the luminance change from the image data of the adjacent frame becomes small; and encoding means for encoding a difference between the image data of the frame adjacent to the input image data and the input image data corrected by said correction means.

2. An apparatus according to claim 1, wherein said detection means detects a difference in the luminance change between the input image data and the image data of the adjacent frame.

3. An apparatus according to claim 1, wherein said encoding means has an intra encoding mode and an inter encoding mode and selects the encoding mode in accordance with the output from said detection means.

4. An apparatus according to claim 2, wherein said correction means corrects the input image data when the difference is smaller than a predetermined value.

5. An apparatus according to claim 2, wherein said encoding means does not output encoded data of the input image data when the difference is smaller than a predetermined value.

6. An apparatus according to claim 1, further comprising recording means for recording the image data encoded by said encoding means on a recording medium.

7. An apparatus according to claim 1, further comprising transmission means for transmitting the image data encoded by said encoding means via a digital interface.

8. An apparatus according to claim 1, further comprising multiplexing means for multiplexing the image data encoded by said encoding means and correction data corresponding to a correction value by said correction means.

9. An apparatus according to claim 1, wherein
said encoding means encodes complying with H.261, H.263, or MPEG.

10. An apparatus according to claim 1, wherein
said input means comprises image sensing means for outputting the image data.

11. A video camera having said image processing apparatus of claim 1.

12. An apparatus according to claim 1, further comprising
decoding means for decoding the image data encoded by said encoding means.

13. An apparatus according to claim 12, wherein the correction means is first correction means, and further comprising second correction means for correcting the luminance of the image data decoded by said decoding means, said second correction means performing correction processing inverse to that of said first correction means.

14. An apparatus according to claim 13, further comprising
display means for displaying the image data corrected by said second correction means.

15. An image processing apparatus comprising:
input means for inputting encoded image data, the encoded image data being provided by encoding a difference between image data of adjacent frame and image data which was corrected so that a change between the luminance thereof and the luminance of the image data of the adjacent frame becomes small;
decoding means for decoding the encoded image data; and
correction means for correcting the luminance of the image data decoded by said decoding means, said correction means performing correction inverse to the luminance correction in the encoding.

16. An apparatus according to claim 15, wherein
said input means inputs correction data corresponding to a value of the luminance correction in the encoding.

17. An apparatus according to claim 16, wherein
said correction means corrects the luminance of the decoded image data in accordance with the correction data.

18. An apparatus according to claim 15, further comprising
display means for displaying the image data processed by said correction means.

19. An apparatus according to claim 15, wherein
said input means comprises reproduction means for reproducing the encoded image data recorded on a recording medium.

20. An apparatus according to claim 15, wherein
said input means comprises a digital interface and inputs the encoded image data from said digital interface.

21. A video camera having said image processing apparatus of claim 15.

22. An image processing method comprising the steps of:
inputting image data;
detecting a luminance change between the input image data and image data of a frame adjacent to the input image data;
correcting the input image data in accordance with the detection result so that the luminance change from the image data of the adjacent frame becomes small; and
encoding a difference between the image data of the frame adjacent to the input image data and the input image data corrected in the correcting step.

23. An image processing method comprising the steps of
inputting encoded image data, the encoded image data being provided by encoding a difference between image data of an adjacent frame and image data which was corrected so that a change between the luminance thereof and the luminance of the image data of the adjacent frame becomes small;
decoding the encoded image data; and
correcting the luminance of the decoded image data, by performing correction inverse to the luminance correction in the encoding.

* * * * *